US010781612B2

(12) United States Patent
Ketels et al.

(10) Patent No.: US 10,781,612 B2
(45) Date of Patent: *Sep. 22, 2020

(54) ACTUATOR FOR A VEHICLE COMPARTMENT

(71) Applicant: Faurecia Interior Systems, Inc., Auburn Hills, MI (US)

(72) Inventors: Cedric Ketels, Mountain View, CA (US); Tristan J. Vanfossen, Belmont, MI (US); Julien Rea, Sunnyvale, CA (US); Louis Thomas, Santa Clara, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/020,194

(22) Filed: Jun. 27, 2018

(65) Prior Publication Data
US 2020/0002979 A1    Jan. 2, 2020

(51) Int. Cl.
| E05B 51/00 | (2006.01) |
| E05B 15/04 | (2006.01) |
| E05B 83/30 | (2014.01) |
| E05B 81/04 | (2014.01) |
| B60K 37/06 | (2006.01) |
| B60R 7/06 | (2006.01) |

(52) U.S. Cl.
CPC ............ *E05B 51/005* (2013.01); *B60K 37/06* (2013.01); *E05B 15/04* (2013.01); *E05B 81/04* (2013.01); *E05B 83/30* (2013.01); *B60K 2370/1438* (2019.05); *B60K 2370/55* (2019.05); *B60R 7/06* (2013.01); *E05B 2015/0406* (2013.01)

(58) Field of Classification Search
CPC ........ E05B 51/005; E05B 15/04; E05B 81/04; E05B 83/30; B60K 37/06
USPC ...................................................... 296/37.12
See application file for complete search history.

(56) References Cited

U.S. PATENT DOCUMENTS

| 3,873,881 | A | 3/1975 | Inoue |
| 7,380,843 | B2 | 6/2008 | Alacqua |
| 7,500,704 | B2 | 3/2009 | Herrera |
| 7,766,409 | B2 | 8/2010 | Ohnuki |
| 7,832,239 | B2 | 11/2010 | Kozuka |
| 7,878,035 | B2 * | 2/2011 | Yamaguchi ............... B60R 7/06 200/43.11 |

(Continued)

FOREIGN PATENT DOCUMENTS

| DE | 10349032 | 5/2005 |
| DE | 102010030645 A1 | 7/2011 |

(Continued)

OTHER PUBLICATIONS

Office Action dated Jul. 10, 2019 for U.S. Appl. No. 16/020,187 (pp. 1-6).

(Continued)

*Primary Examiner* — Joseph D. Pape
(74) *Attorney, Agent, or Firm* — Barnes & Thornburg LLP

(57) ABSTRACT

A vehicle includes a compartment mounted to a frame of the vehicle. The compartment includes a box coupled to a vehicle in a fixed position relative to the vehicle and a latch system coupled to the glove to allow a user access to the box. The latch system includes a shape-memory alloy wire and a spring that are used during actuation of the latch system.

18 Claims, 4 Drawing Sheets

(56) References Cited

U.S. PATENT DOCUMENTS

| | | |
|---|---|---|
| 8,443,600 B2 | 5/2013 | Butera |
| 8,596,704 B2 | 12/2013 | Sielhorst |
| 8,915,524 B2 | 12/2014 | Charnesky |
| 9,316,031 B2 | 4/2016 | Abe |
| 2005/0023086 A1 | 2/2005 | Szilagyi |
| 2008/0007081 A1 | 1/2008 | Shibata |
| 2008/0100079 A1 | 5/2008 | Herrera |
| 2013/0305705 A1 | 11/2013 | Ac |
| 2018/0106079 A1 | 4/2018 | Alacqua |

FOREIGN PATENT DOCUMENTS

| | | |
|---|---|---|
| DE | 102010030645 B4 | 7/2011 |
| DE | 102012000913 A1 | 7/2013 |
| FR | 2655598 | 6/1991 |
| KR | 20050069284 | 7/2005 |
| KR | 20150032168 | 3/2015 |

OTHER PUBLICATIONS

Badescu et al., Compact, Low-Force, Low-Noise Linear Actuator, Tech Briefs, Oct. 1, 2012, available at https://www.techbriefs.com/component/content/article/tb/techbriefs/mechanics-and-machinery/14923, 3 pages.

Office Action dated Jan. 10, 2020 for U.S. Appl. No. 16/020,201, (pp. 1-8).

Office Action dated Jan. 16, 2020 for U.S. Appl. No. 16/020,201, (pp. 1-8).

Office Action dated Dec. 2, 2019 for U.S. Appl. No. 16/020,187 (pp. 1-5).

* cited by examiner

ACTUATOR FOR A VEHICLE COMPARTMENT

BACKGROUND

The present disclosure relates to actuators for a compartment, and particularly to actuators adapted for use with vehicle compartments. More particularly, the present disclosure relates to actuators adapted for use with glove box compartments.

SUMMARY

According to the present disclosure, a vehicle includes a glove compartment mounted to the frame of the vehicle. The glove compartment includes a glove box coupled to a vehicle in a fixed position relative to the vehicle and a latch system coupled to the glove box to allow a user access to the glove box. The glove box includes a container formed to include an aperture arranged to open into a space formed in the container and a lid coupled to the container and to move relative to the container between a closed position and an open position.

In illustrative embodiments, the latch system includes a latch configured to change the lid from the closed position to the open position and an actuator coupled to the latch and configured to cause the latch to change the lid from the closed position to the open position in response to an input from a user. In illustrative embodiments, the actuator includes a shape-memory alloy wire coupled to the latch to move the latch in response to changes in length of the shape-memory alloy wire, a wire guide coupled to the container and configured to engage and guide the shape-memory alloy wire as the shape-memory allow wire changes lengths, and a control system coupled to the shape-memory alloy wire and configured to apply power to the shape-memory alloy wire to cause the shape-memory alloy wire to change lengths in response to receipt of the input to the control system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
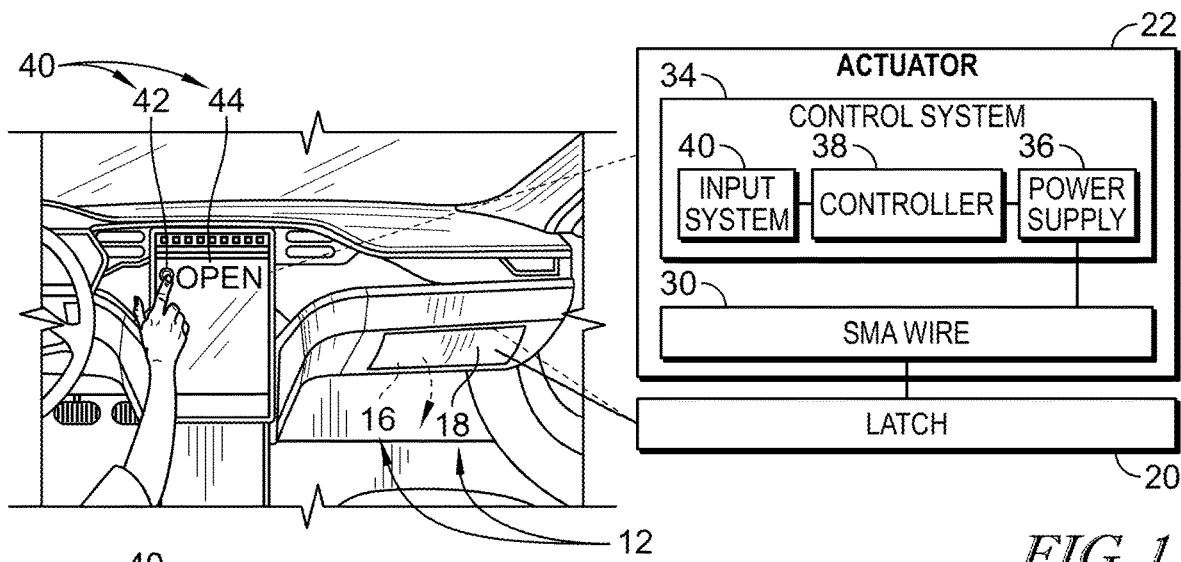
FIG. 1 is a perspective and diagrammatic view of a glove compartment in accordance with the present disclosure showing that the glove compartment includes a glove box and a latch system coupled to the glove box and to allow the glove box to change between a close position and an open position in response to an input provided by a control system.
Figure 2:
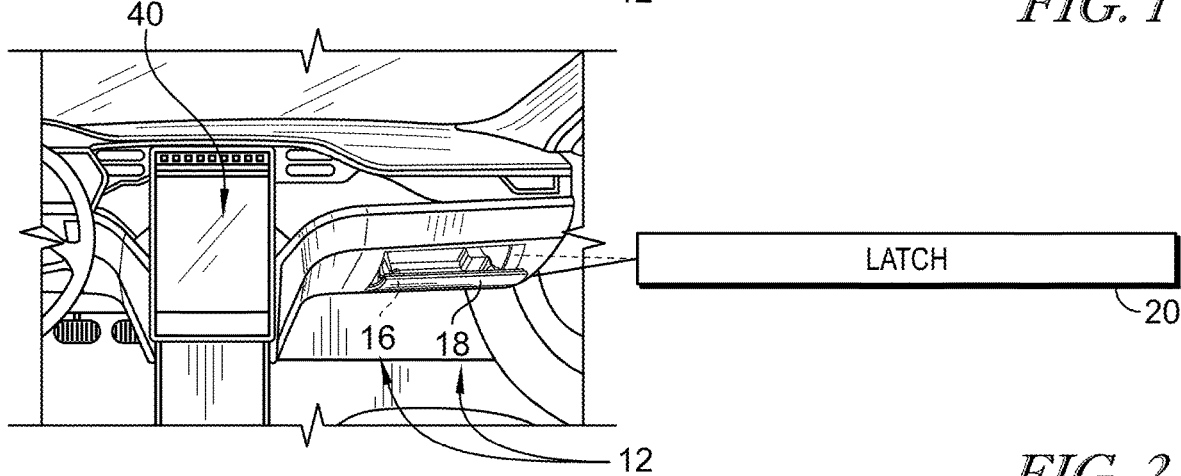
FIG. 2 is a view similar to FIG. 1 in which the latch system has been engaged to cause the glove box to move to the open position in response to receipt of by the input provided by a passenger.
Figure 3:
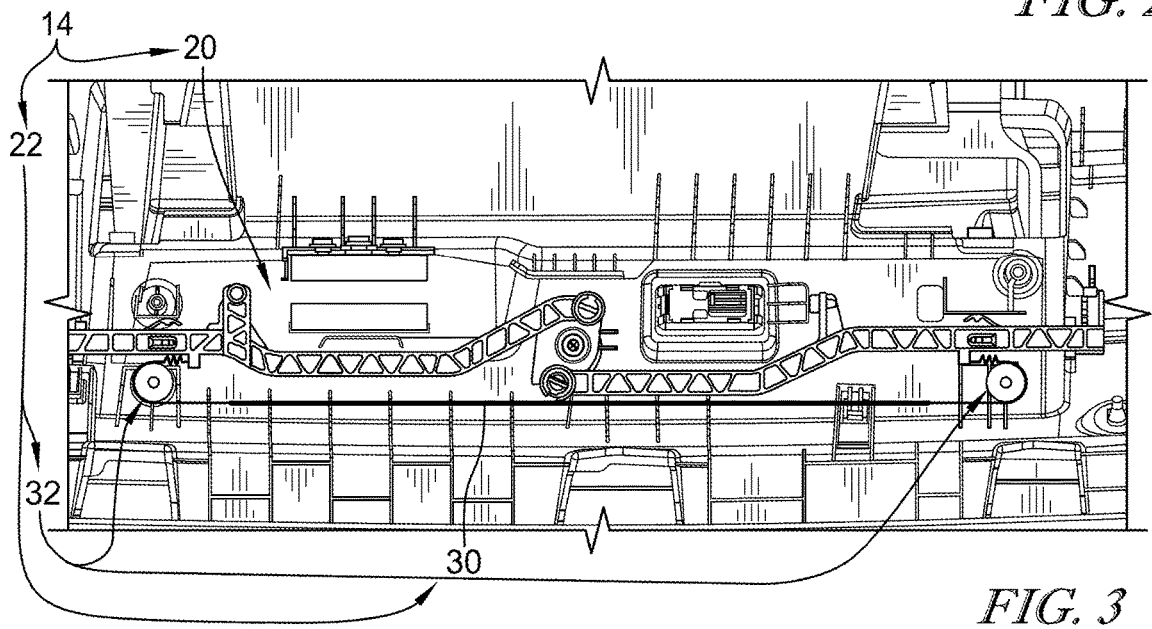
Figure 4:
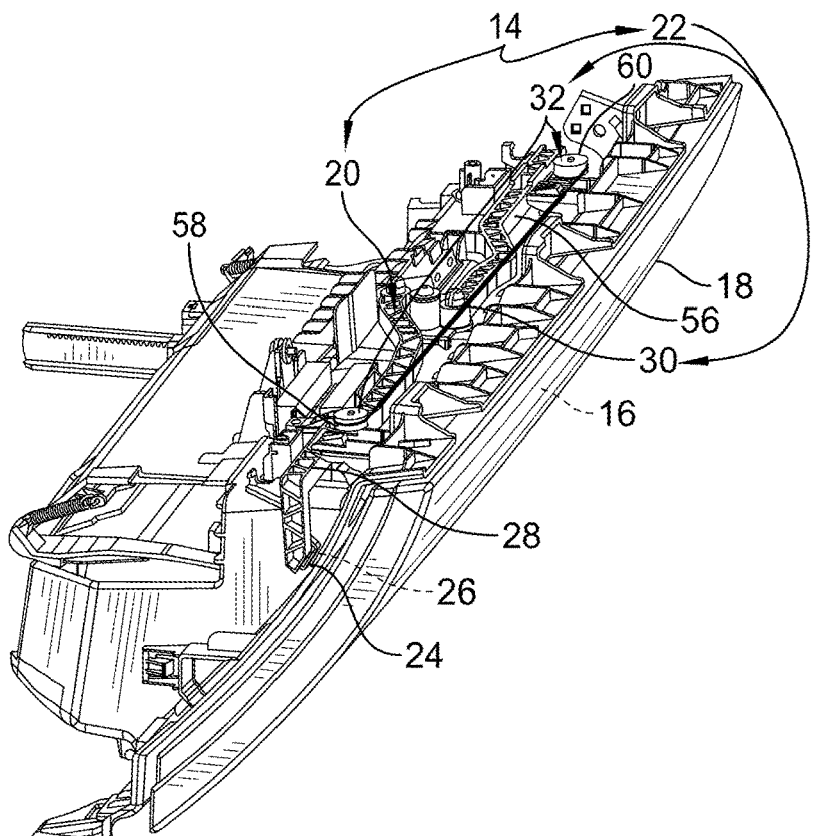
Figure 5:
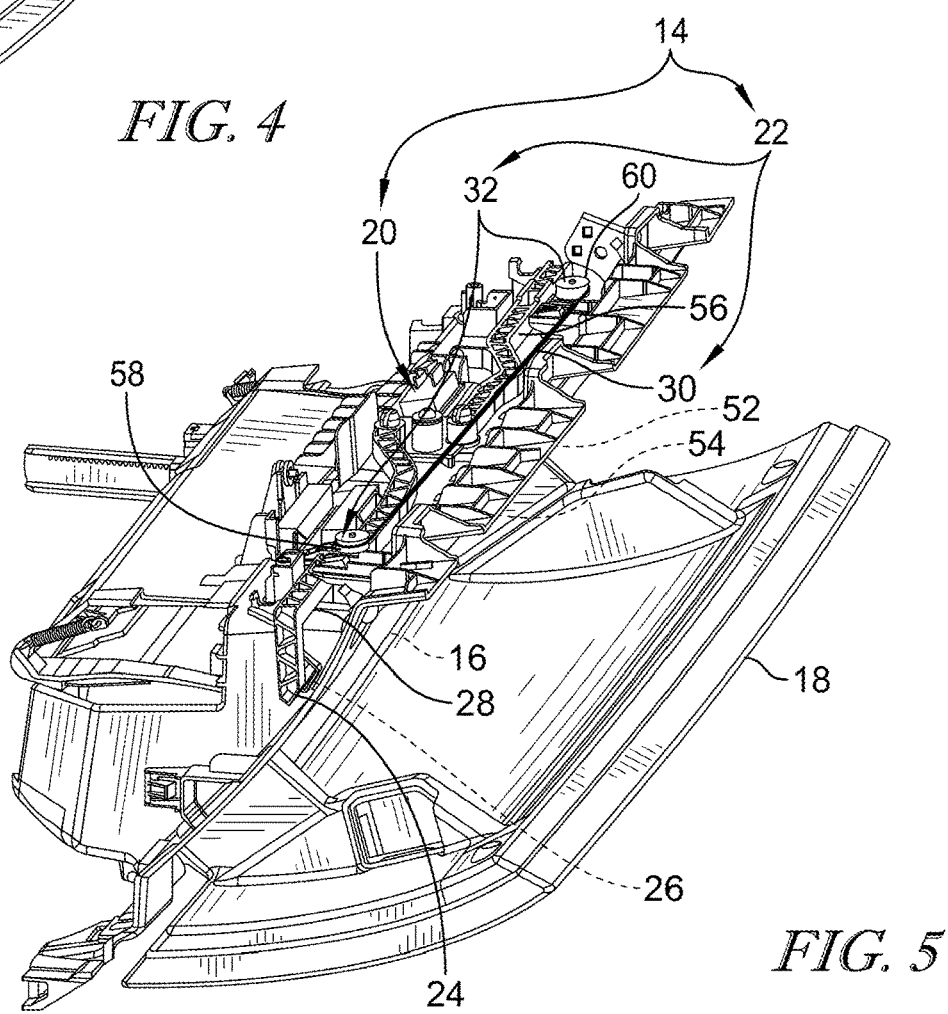
Figure 6:
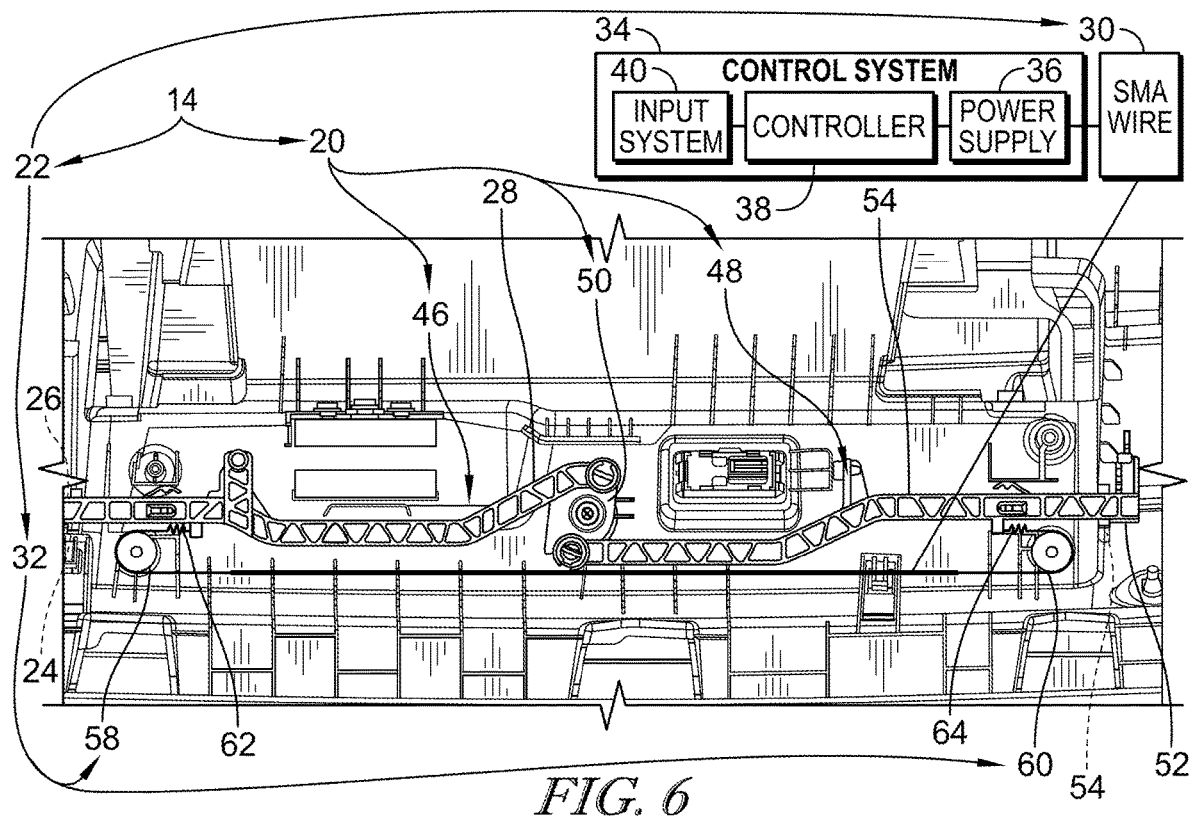
Figure 7:
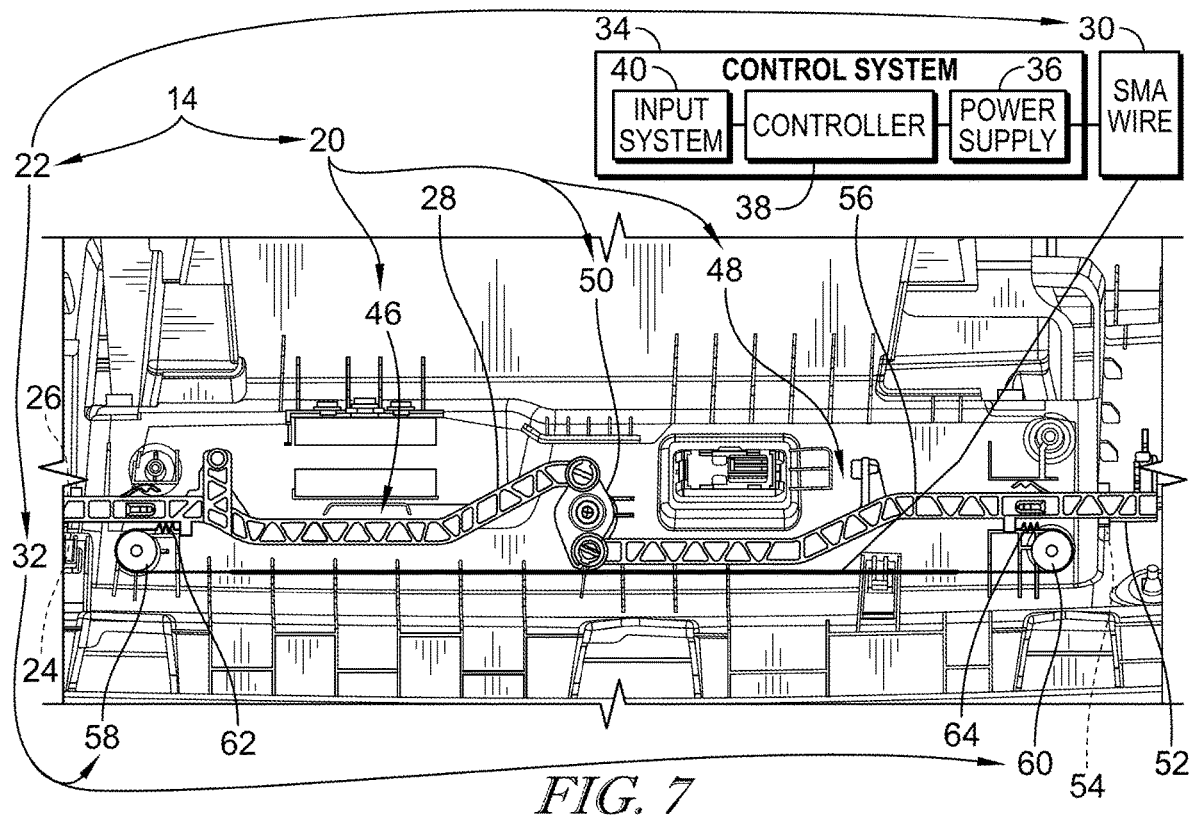

FIG. 3 is a partial plan view of the glove box in FIGS. 1 and 2 showing the latch system including a latch and an actuator coupled to the latch and configured to move the latch from a first position to a second position, the actuator including a shape memory alloy wire coupled to the latch and configured to change between a first length and a second length shown in FIG. 7 in response to the input from the passenger;

FIG. 4 is a perspective view of the glove compartment of FIGS. 1 and 2 showing the latch system in the first position and the glove box in the closed position;

FIG. 5 is a view similar to FIG. 4 showing the latch system in the second position and the glove box in the open position;

FIG. 6 is a partial plan view and diagrammatic view of the glove box showing the shape memory alloy wire at the first length causing the latch to be in the first position;

FIG. 7 is a view similar to FIG. 6 showing the shape-memory alloy wire has changed from the first length to the second length causing the latch to move from the first position to the second position to cause the glove box to be in the open position.

Figure 8:
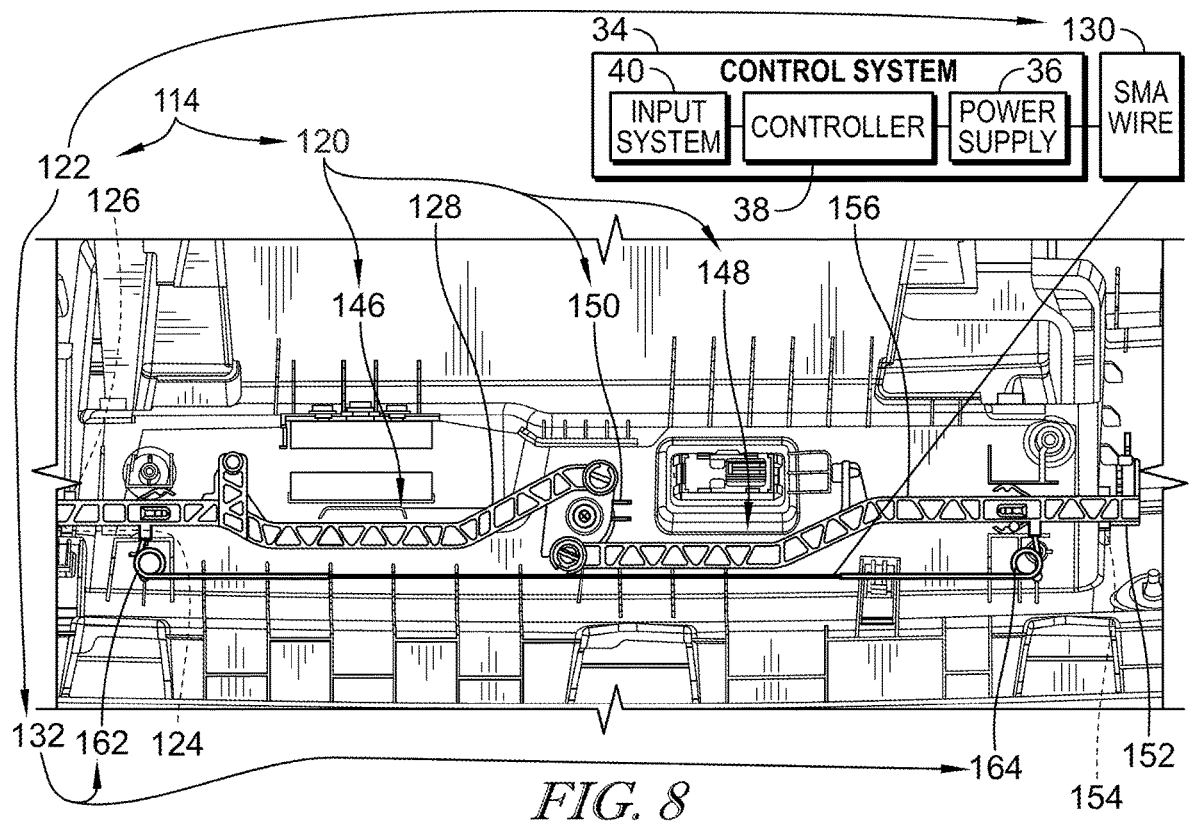
Figure 9:
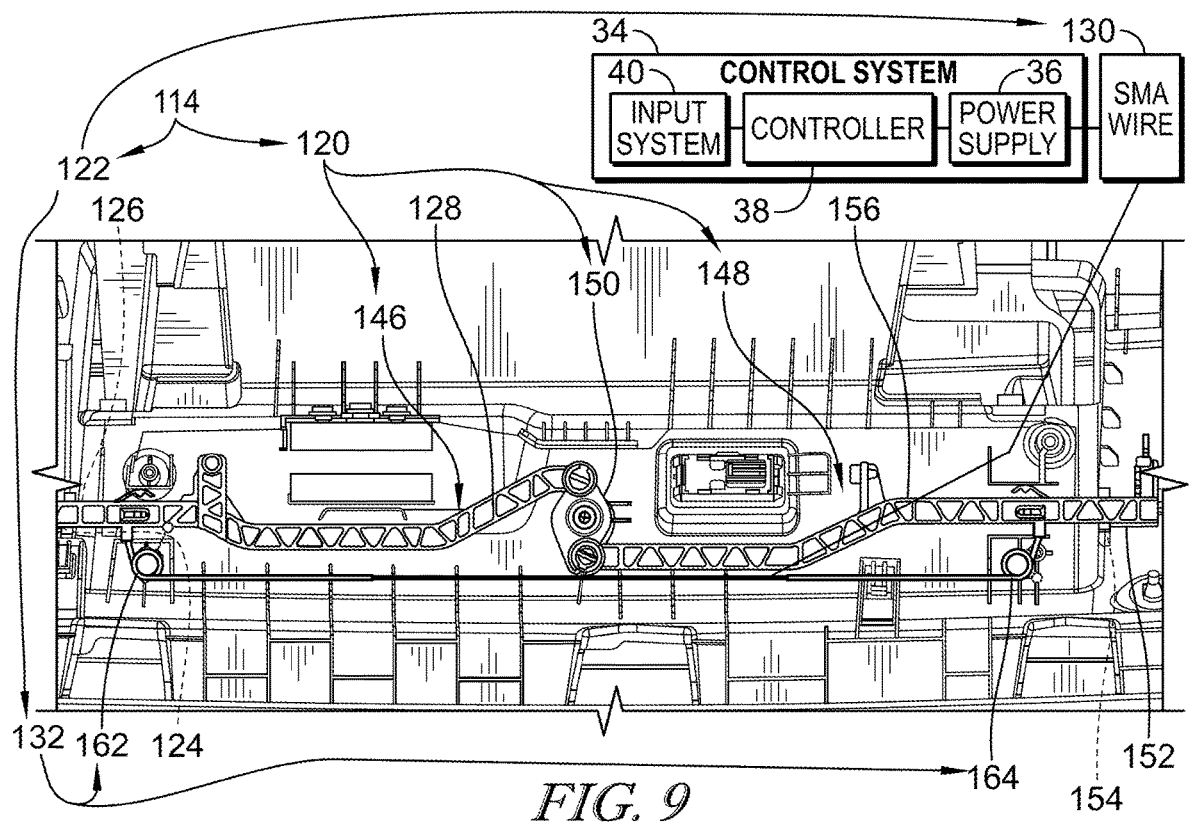

FIG. 8 is a partial plan view and diagrammatic view of a second embodiment of the latch system including a latch and an actuator coupled to the latch and configured to move the latch from a first position to a second position, the actuator including a shape-memory alloy wire coupled to the latch and configured to change between a first length and a second length in response to an input from the passenger; and FIG. 9 is a view similar to FIG. 8 showing shape-memory alloy wire has changed from the first length to the second length causing the latch to move from the first position to the second position to cause the glove box to be in the open position.

DETAILED DESCRIPTION

A first embodiment of a glove compartment 10 is shown in FIGS. 1-7. The glove compartment includes a glove box 12 and a latch system 14 configured to receive inputs from a user to cause the glove box 12 to change between a closed position shown in FIGS. 1 and 4 and an open position shown in FIGS. 2 and 5. A second embodiment of a glove compartment 110 is shown in FIGS. 8 and 9.

A glove compartment 10 includes a glove box 12 and a latch system 14 as shown in FIGS. 1-3. The glove box 12 is adapted to be coupled to a vehicle in a fixed position relative to the vehicle. The latch system 14 is coupled to the glove box 12 and is configured to allow a user access to the glove box 12.

The glove box 12 includes a container 16 and a lid 18 as shown in FIG. 4. The container 16 is formed to include an aperture arranged to open into a space formed in the container 16. The lid 18 is coupled to the container 16 and moves relative to the container 16 between a closed position as shown in FIGS. 1 and 4 and an open position as shown in FIGS. 2 and 5.

The latch system 14 includes a latch 20 and an actuator 22 as shown in FIGS. 3-7. The latch 20 is configured to allow the lid 18 to move between the closed position and the open position. The lid 18 is in the closed position when the lid 18 closes the aperture and blocks access to the space. The lid is in the open position when the lid 18 has moved away from the container 16 to allow access to the space through the aperture. The actuator 22 is coupled to the latch 20 and is configured to cause the latch to move the latch 20.

The latch 20 includes a first lock-unit 46, a second lock-unit 48, and a lock-unit transmission 50 as shown in FIGS. 6 and 7. The first lock-unit 46 unit is coupled to the container 16 to move relative to the container 16. The second lock-unit 48 unit is coupled to the container 16 to move relative to the container 16. The lock-unit transmission 50 is arranged to extend between and interconnect the first lock-unit 46 and the second lock-unit 48 to cause movement of the first lock-unit 46 to be transmitted to the second lock-unit

48. The first lock-unit 46 and the second lock-unit 48 move away from one another when the latch 20 is in the unlocked configuration and move toward one another when the latch 20 is in the locked configuration.

The first lock-unit 46 includes a first lock tab 24, a first lock-tab receiver 26, and a first tab-mover arm 28 as shown in FIG. 3. The first lock tab 24 is movable between a first lock-tab position as shown in FIG. 6 and a second lock-tab position as shown in FIG. 7. The first lock tab 24 is in the first lock-tab position when movement of the lid 18 relative to the container 16 is blocked. The first lock tab 24 is in the second lock-tab position when movement of the lid 18 away from the container 16 is permitted. The first lock-tab receiver 26 is configured to receive the first lock tab 24 therein when the first lock tab 24 is in the first lock-tab position and the lid 18 is in the closed position. The first tab-mover arm 28 is coupled to the first lock tab 24 to move therewith.

The second lock-unit 48 includes a second lock tab 52, a second lock tab receiver 54, and a second tab-mover arm 56 as shown in FIGS. 4-7 The second lock tab 52 is movable between a third lock-tab position as shown in FIG. 6 and a fourth lock-tab position as shown in FIG. 7. The second lock tab 52 is in the third lock-tab position when movement of the lid relative to the container is blocked when the lid 18 is in the closed position. The second lock tab 52 is in the fourth lock-tab position when movement of the lid 18 away from the container 16 is permitted. The second lock tab receiver 54 is configured to receive the second lock tab 52 therein when the second lock tab 52 is in the third lock-tab position and the lid is in the closed position. The second tab-mover arm 56 is coupled to the second lock tab 52 to move therewith.

The actuator 22 includes a shape-memory alloy wire 30, a wire guide 32, and a control system 34 as shown in FIGS. 3-7. The shape-memory alloy wire 30 is coupled to the first tab-mover arm 28 to move the first tab-mover arm 28 in response to changes in length of the shape-memory alloy wire 30. The shape-memory alloy wire 30 changes between a first length as shown in FIG. 6 associated with the first lock tab position and a relatively smaller second length as shown in FIG. 7 associated with the second lock tab position. The shape-memory alloy wire 30 changes between the first length and the relatively smaller second length to allow the lid 18 to change from the closed position to the open position. The wire guide 32 is coupled to the container 16 and is configured to engage and guide the shape-memory alloy wire 30 as the shape-memory allow wire 30 changes between the first length and the relatively smaller second length. The control system 34 is coupled to the shape-memory alloy wire 30 and is configured to apply power to the shape-memory alloy wire 30 to cause the shape-memory alloy wire 30 to change between the first and second lengths in response to receipt of the input to the control system 34. In one example, the change in length from the first length to the relatively small second length is about 8 millimeters and occurs in about 0.8 seconds. The change in length provides a force of about 22.5 Newtons.

In one example, the wire guide 32 includes a first pulley 58 and a second pulley 60. The first pulley 58 is coupled to the container 16 and is configured to rotate about a first axis relative to the container 16. The second pulley 60 is coupled to the container 16 and is located in a spaced apart relation to the first pulley 58. The second pulley 60 is configured to rotate about a second axis relative to the container 16. The first pulley 58 and the second pulley 60 rotate in response to the shape-memory alloy wire 30 changing between the first length and the relatively smaller second length.

In another example, the wire guide 32 further includes a first spring 62 and a second spring 64. The first spring 62 is coupled to the first tab-mover arm 28 and is arranged to extend from the first tab-mover arm 28 toward the first pulley 58 along a section (e.g., a second section) of the shape-memory alloy wire 30. In another example, the first spring 62 is a crimped portion of the shape-memory alloy wire that is arranged to extend between and interconnect the first tab-mover arm 28 and the second section of the shape-memory alloy wire 30. The first spring 62 is configured to provide a first bias force to the first tab-mover arm 28 to urge the first tab-mover arm to move in the second direction to cause the first lock tab 24 to move toward the first lock-tab position. The second spring 64 is coupled to the second tab-mover arm 56 and is arranged to extend from the second tab-mover arm 56 toward the second pulley 60 along a section (e.g., a fourth section) of the shape-memory alloy wire 30. In another example, the second spring 64 is a crimped portion of the shape-memory alloy wire that is arranged to extend between and interconnect the second tab-mover arm 56 and the fourth section of the shape-memory alloy wire 30. The second spring 64 is configured to provide a second bias force to the second tab-mover arm 56 to urge the second tab-mover arm 56 to move in the first direction to cause the second lock-tab to move toward the third lock-tab position.

The shape-memory alloy wire 30 includes an active portion and a non-active portion. The active portion of the shape-memory alloy wire 30 changes in response to power provided to the shape-memory alloy wire 30 from the control system 34. The non-active portion of the shape-memory alloy wire does not change in length in response to power provided to the shape-memory alloy wire 30 from the control system 34. The active portion of the shape-memory alloy wire 30 includes, for example, a first section and a third section. The non-active portion of the shape-memory alloy wire 30 includes a second section, a fourth section, and the crimped portions providing the first and second springs 62, 64. In one example, the active portion has a length of about 300 millimeters.

In one example, the second section of the shape-memory alloy wire 30 is arranged to extend from first section of the shape-memory alloy wire 30, around the first pulley 58, and interconnect the first section of the shape-memory alloy wire 30 and the fourth section of the shape-memory alloy wire 30. The fourth section of the shape-memory alloy wire 30 is arranged to extend from the third section of the shape-memory alloy wire 30, around the second pulley 60, and interconnect the third section of the shape-memory alloy wire 30 and the second section of the shape-memory alloy wire 30. The second and fourth sections of shape-memory alloy wire 30 do not change in length when power is provided to the shape-memory alloy wire 30 so as to provide a bias force to the latch 20 to urge the first lock tab 24 to return to the first position and the second lock tab 52 to return to the second lock-tab position.

A method for using the latch system 14 includes several steps. The method begins with the first lock tab 24 in the first lock-tab position, the second lock tab 52 in the third lock-tab position, and the lid 18 in the closed position. A user desiring to change the lid 18 from the closed position to the open position continues the method by providing an input to the control system 34 which causes the an amount of power to flow to the shape-memory alloy wire 30 and causes the shape-memory alloy wire 30 to shrink from the first length to the second length as shown in FIGS. 6 and 7. The wire guide 32 engages and guides the shape-memory alloy wire 30 as the shape-memory alloy wire 30 changes from the first length to the second length.

The changing of length of the shape-memory alloy wire 30 from the first length to the second length causes the first tab-mover arm 28 to engage and move both the first lock tab 24 and the second lock tab 52. When engaged, the first lock tab 24 moves in a first direction from the first lock-tab position to the second lock-tab position and the second lock tab 52 moves in the second direction from the third lock-tab position to the fourth lock-tab position to allow the lid 18 to change from the closed position to the open position.

Additionally, the flow of power from the control system 34 to the shape-memory alloy wire 30 causes the first section of the shape-memory alloy wire 30 to move in an opposite second direction to cause the second section of the shape-memory alloy wire to move in the first direction. The second section of the shape-memory alloy wire is arranged to extend between and interconnect the first tab-mover arm and the first portion of the shape-memory alloy wire to move the first tab-mover arm. The third section of the shape-memory alloy wire moves in the first direction to cause a fourth section of the shape-memory alloy wire to move in the second direction. The fourth section of the shape-memory alloy is arranged to extend between and interconnect the second tab-mover arm and third portion of the shape-memory alloy wire to move the first tab-mover arm.

The method continues with the user no longer providing the input to the control system 34 which stops the flow of power to the shape-memory alloy wire 30 and causes the shape-memory alloy wire 30 to return to the first length from the second length upon cooling. The wire guide 32 engages and guides the shape-memory alloy wire 30 as the shape-memory alloy wire 30 changes from the second length to the first length. The changing of length of the shape-memory alloy wire 30 from the second length to the first length causes the first lock tab 24 to move the opposite second direction from the second lock-tab position to the first lock-tab position and the second lock tab 52 to move the opposite the first direction from the fourth lock-tab position to the third lock-tab position.

The shape-memory alloy wire 30 further includes a length of the first section and a length of the second section. The length of the first section is greater than a length of the second section when the shape-memory alloy wire 30 has either the first or the second lengths. In one example, the first section has a length of about 300 millimeters.

The control system 34 includes a power supply 36, a controller 38, and an input system 40 as shown in FIGS. 1 and 2. The power supply 36 is coupled to the control system 34 and is configured to provide power to the shape-memory alloy wire 30. The controller is coupled to the power supply 36 and the input system 40 and is configured to provide power to the shape-memory alloy wire 30 in response to an input being provided from a user.

In one example, the input system 40 may include a button 42 coupled to the control system 34 and is configured to provide the input in response to engagement of the button 42. In another example, the input system 40 may also include a touch screen 44 coupled to the control system 34 and configured to provide the input in response to engagement of the touch screen 44. The input system may further include a remote device. The remote device is coupled to the control system 34 and is configured to provide the input in response to engagement of the remote device.

In another example, the glove compartment 10 includes the glove box 12 and the latch system 14 as shown in FIGS. 1-3. The glove box 12 is adapted to be coupled to a vehicle in a fixed position relative to the vehicle. The latch system 114 is coupled to the glove box 12 and allows a user access to the glove box 12.

The glove box 12 includes the container 16 and the lid 18 as shown in FIGS. 1 and 2. The container 16 is formed to include an aperture arranged to open into a space formed in the container. The lid 18 is coupled to the container 16 and moves relative to the container 16 between a closed position as shown in FIGS. 1 and 4 and an open position as shown in FIGS. 2 and 5. The lid 18 is in the closed position when the lid closes the aperture and blocks access to the space. The lid 18 is in the open position when the lid has moved away from the container 16 to allow access to the space through the aperture.

The latch system 114 includes the latch 120 and the actuator 122 as shown in FIGS. 8 and 9. The latch 120 is coupled to the lid 18 and is configured to change the lid 18 from the closed position to the open position. The actuator 122 is coupled to the latch 120 and is configured to cause the latch 120 to change the lid 18 from the closed position to the open position in response to an input from a user.

The latch 120 includes a first lock-unit 146, a second lock-unit 148, and a lock-unit transmission 150 as shown in FIGS. 8 and 9. The first lock-unit 146 unit is coupled to the container 16 to move relative to the container 16. The second lock-unit 148 unit is coupled to the container 16 to move relative to the container 16. The lock-unit transmission 150 is arranged to extend between and interconnect the first lock-unit 146 and the second lock-unit 148 to cause movement of the first lock-unit 146 to be transmitted to the second lock-unit 148. The first lock-unit 146 and the second lock-unit 148 move away from one another when the latch 120 is in the unlocked configuration and move toward one another when the latch 120 is in the locked configuration.

The first lock-unit 146 includes a first lock tab 124, a first lock-tab receiver 126, and a first tab-mover arm 128 as shown in FIGS. 8 and 9. The first lock tab 124 is movable between a first lock-tab position as shown in FIG. 8 and a second lock-tab position as shown in FIG. 9. The first lock tab 124 is in the first lock-tab position when movement of the lid 18 relative to the container 16 is blocked. The first lock tab 124 is in the second lock-tab position when movement of the lid 18 away from the container 16 is permitted. The first lock-tab receiver 126 is configured to receive the first lock tab 124 therein when the first lock tab 124 is in the first lock-tab position and the lid 18 is in the closed position. The first tab-mover arm 128 is coupled to the first lock tab 124 to move therewith.

The second lock-unit 148 includes a second lock tab 152, a second lock tab receiver 154, and a second tab-mover arm 156 as shown in FIGS. 8 and 9. The second lock tab 152 is movable between a third lock-tab position as shown in FIG. 8 and a fourth lock-tab position as shown in FIG. 9. The second lock tab 152 is in the third lock-tab position when movement of the lid relative to the container is blocked when the lid 18 is in the closed position. The second lock tab 152 is in the fourth lock-tab position when movement of the lid 18 away from the container is permitted. The second lock tab receiver 154 is configured to receive the second lock tab 152 therein when the second lock tab 152 is in the third lock-tab position and the lid is in the closed position. The second tab-mover arm 156 is coupled to the second lock tab 152 to move therewith.

The actuator 122 includes a shape-memory alloy wire 130, a wire transmission 132, and the control system 34 as shown in FIGS. 8 and 9. The shape-memory alloy wire 130 is coupled to the wire transmission 132 to move the wire transmission 132 in response to changes in length of the shape-memory alloy wire 130. The shape-memory alloy wire 130 changes between a first length as shown in FIG. 8 and a relatively smaller second length as shown in FIG. 9. The wire transmission 132 is coupled to the container 16. The wire transmission 132 is configured to transfer movement of the shape-memory alloy wire 30 as the shape-memory alloy wire 30 changes from the first length to the relatively smaller second length to the first and second tab-mover arms 28, 56. The shape-memory alloy wire 130 includes a first section of the shape-memory alloy wire and a second section of the shape-memory alloy wire 30 as shown in FIGS. 8 and 9.

The shape-memory alloy wire 130 further includes a length of the first section and a length of the second section. The length of the first section is greater than a length of the second section when the shape-memory alloy wire 130 has either the first or the second lengths.

The wire transmission 132 further includes a first spring 162 as shown in FIGS. 8 and 9. The first spring 162 is arranged to extend between and interconnect the first section of the shape-memory alloy wire 130 and the first tab-mover arm 128. The first spring 162 is configured to transmit movement of the first section of the shape-memory alloy wire 130 in the first direction to the first tab-mover arm 128 to cause the first tab-mover arm 128 to move in the second direction. The first spring 162 is further configured to provide a first bias force to the first tab-mover arm 128 to urge the first tab-mover arm 128 to move in the second direction to cause the first lock tab 124 to move toward the first lock-tab position.

The wire transmission 132 further includes a second spring 164 as shown in FIGS. 8 and 9. The second spring 164 is arranged to extend between and interconnect the second section of the shape-memory alloy wire 130 and the second tab-mover arm 156. The second spring 164 is configured to transmit movement of the second section of the shape-memory alloy wire 130 in the second direction to the second tab-mover arm 156 to cause the second tab-mover arm 156 to move in the first direction. The second spring 164 is further configured to provide a second bias force to the second tab-mover arm 156 to urge the second tab-mover arm 156 to move in the first direction to cause the second lock tab 152 to move toward the third lock-tab position. In some examples, the first spring 162 and second spring 164 is torsion springs.

The control system 34 includes a power supply 36, a controller 38, and an input system 40 as shown in FIGS. 1-2. The power supply 36 is coupled to the control system 34 and is configured to provide power to the shape-memory alloy wire 130. The controller is coupled to the power supply 36 and the input system 40 and is configured to provide power to the shape-memory alloy wire 130 in response to an input being provided from a user.

In one example, the input system 40 may include a button 42 coupled to the control system 34 and is configured to provide the input in response to engagement of the button 42. In another example, the input system 40 may also include a touch screen 44 coupled to the control system 34 and configured to provide the input in response to engagement of the touch screen 44. The input system may further include a remote device. The remote device is coupled to the control system 34 and is configured to provide the input in response to engagement of the remote device.

An actuator in accordance with the present disclosure may be used as part of a compartment. The compartment, in one example, may be in a vehicle. The compartment includes a box and a latch. The box includes include a container and a lid. The latch is configured to selectively limit access to the container by blocking movement of the lid. In one example, the container is an engine bay and the lid is a hood of the vehicle. In another example, the container is a trunk and the lid is a trunk lid. In another example, the container is a passenger cabin and the lid is a door of the vehicle.

The following numbered clauses include embodiments that are contemplated and non-limiting:

Clause 1. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 2. The glove compartment of clause 1, any other clause, or any combination of clauses, further comprising a latch including a first lock tab movable between a first lock-tab position in which movement of the lid relative to the container is blocked when the lid is in the closed position and a second lock-tab position in which movement of the lid away from the container is permitted.

Clause 3. The glove compartment of clause 2, any other clause, or any combination of clauses, wherein the latch further includes a first lock-tab receiver configured to receive the first lock tab therein when the lock tab is in the first lock-tab position and the lid is in the closed position.

Clause 4. The glove compartment of clause 3, any other clause, or any combination of clauses, wherein the latch further includes a first tab-mover arm coupled to the first lock tab to move therewith.

Clause 5. The glove compartment of clause 4, any other clause, or any combination of clauses, further comprising an actuator coupled to the first tab-mover arm and configured to cause the first tab-mover arm to move the first lock tab between the first and second lock-tab positions in response to an input.

Clause 6. The glove compartment of clause 5, any other clause, or any combination of clauses, wherein the actuator includes a shape-memory alloy wire coupled to the first tab-mover arm to move the first tab-mover arm in response to changes in length of the shape-memory alloy wire between a first length associated with the first lock-tab position and a relatively smaller second length associated with the second lock-tab position.

Clause 7. The glove compartment of clause 6, any other clause, or any combination of clauses, wherein the actuator further includes a control system coupled to the shape-memory alloy wire and configured to apply power to the shape-memory alloy wire to cause the shape-memory alloy wire to change between the first and second lengths in response to receipt of the input to the control system.

Clause 8. The glove compartment of clause 7, any other clause, or any combination of clauses, wherein the first lock tab moves in a first direction from the first lock-tab position to the second lock-tab position and a first section of the shape-memory alloy wire moves in an opposite second direction to cause a second section of the shape-memory alloy wire to move in the first direction and the second section of the shape-memory alloy wire arranged to extend between and interconnect the first tab-mover arm and the first portion of the shape-memory alloy wire to move the first tab-mover arm.

Clause 9. The glove compartment of clause 8, any other clause, or any combination of clauses, wherein the latch further includes a second lock tab movable between a third lock-tab position in which movement of the lid relative to the container is blocked when the lid is in the closed position and a fourth lock-tab position in which movement of the lid away from the container is permitted, a second lock-tab receiver configured to receive the second lock tab therein when the second lock tab is in the third lock-tab position and the lid is in the closed position, and a second tab-mover arm coupled to the second lock tab to move therewith.

Clause 10. The glove compartment of clause 9, any other clause, or any combination of clauses, wherein the second lock tab moves in the second direction from the third lock-tab position to the fourth lock-tab position and a third section of the shape-memory alloy wire moves in the first direction to cause a fourth section of the shape-memory alloy wire to move in the second direction and the fourth section of the shape-memory alloy arranged to extend between and interconnect the second tab-mover arm and third portion of the shape-memory alloy wire to move the first tab-mover arm.

Clause 11. The glove compartment of clause 10, any other clause, or any combination of clauses, wherein the actuator includes a wire guide coupled to the container and configured to engage and guide the shape-memory alloy wire as the shape-memory allow wire changes between the first length and the relatively smaller second length, the wire guide includes a first pulley coupled to the container and configured to rotate about a first axis relative to the container and a second pulley located in spaced-apart relation to the first pulley and configured to rotate about a second axis relative to the container, and the first and second pulleys rotate in response to the shape-memory alloy wire changing between the first length and the relatively smaller second length Clause 12. The glove compartment of clause 7, any other clause, or any combination of clauses, wherein the wire guide further includes a first spring coupled to the first tab-mover arm and configured to provide a first bias force to the first tab-mover arm to urge the first tab-mover arm to move in the second direction to cause the first lock-tab to move toward the first lock-tab position.

Clause 13. The glove compartment of clause 12, any other clause, or any combination of clauses, wherein the first spring is arranged to extend between and interconnect the first tab-mover arm and the second section of the shape-memory alloy wire.

Clause 14. The glove compartment of clause 13, any other clause, or any combination of clauses, wherein the wire guide further includes a second spring coupled to the second tab-mover arm and configured to provide a second bias force to the second tab-mover arm to urge the second tab-mover arm to move in the first direction to cause the second lock-tab to move toward the third lock-tab position.

Clause 15. The glove compartment of clause 14, any other clause, or any combination of clauses, wherein the first spring is a crimped portion of the shape-memory alloy wire.

Clause 16. The glove compartment of clause 7, any other clause, or any combination of clauses, wherein the first lock tab moves in a first direction from the first lock-tab position to the second lock-tab position and a first section of the shape-memory alloy wire moves in an opposite second direction to cause the first tab-mover arm to move the first lock-tab to the second lock-tab position.

Clause 17. The glove compartment of clause 16, any other clause, or any combination of clauses, wherein the latch further includes a second lock tab movable between a third lock-tab position in which movement of the lid relative to the container is blocked when the lid is in the closed position and a fourth lock-tab position in which movement of the lid away from the container is permitted, a second lock-tab receiver configured to receive the second lock tab therein when the second lock tab is in the third lock-tab position and the lid is in the closed position, and a second tab-mover arm coupled to the second lock tab to move therewith.

Clause 18. The glove compartment of clause 17, any other clause, or any combination of clauses, wherein the second lock tab moves in the second direction from the third lock-tab position to the fourth lock-tab position and a second section of the shape-memory alloy wire moves in the first direction to cause the second tab-mover arm to move the second lock-tab to the second lock-tab position.

Clause 19. The glove compartment of clause 18, any other clause, or any combination of clauses, wherein the actuator includes a wire transmission coupled to the container and configured to transfer movement of the shape-memory alloy wire as the shape-memory alloy wire changes from the first length to the relatively smaller second length to the first and second tab-mover arms.

Clause 20. The glove compartment of clause 7, any other clause, or any combination of clauses, wherein the wire transmission includes a first spring arranged to extend between and interconnect the first section of the shape-memory alloy wire and the first tab-mover arm, the first spring configured to transmit movement of the first section of the shape-memory alloy wire in the first direction to the first tab-mover arm to cause the first tab-mover arm to move in the second direction, and the first spring is further configured to provide a first bias force to the first tab-mover arm to urge the first tab-mover arm to move in the second direction to cause the first lock tab to move toward the first lock-tab position.

Clause 21. The glove compartment of clause 20, any other clause, or any combination of clauses, wherein the wire transmission further includes a second spring arranged to extend between and interconnect the second section of the shape-memory alloy wire and the second tab-mover arm, the second spring configured to transmit movement of the second section of the shape-memory alloy wire in the second direction to the second tab-mover arm to cause the second tab-mover arm to move in the first direction, and the second spring is further configured to provide a second bias force to the second tab-mover arm to urge the second tab-mover arm to move in the first direction to cause the second lock tab to move toward the third lock-tab position.

Clause 22. The glove compartment of clause 21, any other clause, or any combination of clauses, wherein the first and second springs are torsion springs.

Clause 23. The glove compartment of clause 7, any other clause, or any combination of clauses, wherein the control system includes an input system configured to provide the input and the input system includes a button coupled to the control system and configured to provide the input in response to engagement of the button.

Clause 24. The glove compartment of clause 7, any other clause, or any combination of clauses, wherein the control system includes an input system configured to provide the input and the input system includes a touch screen coupled to the control system and configured to provide the input in response to engagement of the touch screen.

Clause 25. The glove compartment of clause 7, any other clause, or any combination of clauses, wherein the control system includes an input system configured to provide the input and the input system includes a remote device in communication with the control system and configured to provide the input in response to engagement of the remote device.

Clause 26. The glove compartment of clause 7, any other clause, or any combination of clauses, wherein the actuator includes a wire guide coupled to the container and configured to engage and guide the shape-memory alloy wire as the shape-memory allow wire changes between the first length and the relatively smaller second length.

Clause 27. The glove compartment of clause 7, any other clause, or any combination of clauses, wherein a first section of the shape-memory alloy wire moves in an opposite second direction to cause a second section of the shape-memory alloy wire to move in the first direction and the second section of the shape-memory alloy wire is arranged to extend between and interconnect the tab-mover arm and the first section of the shape-memory alloy wire.

Clause 28. The glove compartment of clause 1, any other clause, or any combination of clauses, further comprising a latch coupled to the container to change between a locked configuration in which movement of the lid from the closed position is blocked and an unlocked configuration in which movement of the lid from the closed position is permitted.

Clause 29. The glove compartment of clause 28, any other clause, or any combination of clauses, wherein the latch includes a first lock unit coupled to the container to move relative to the container.

Clause 30. The glove compartment of clause 29, any other clause, or any combination of clauses, wherein the latch includes a second lock unit coupled to the container to move relative to the container.

Clause 31. The glove compartment of clause 30, any other clause, or any combination of clauses, wherein the latch includes a lock-unit transmission arranged to extend between and interconnect the first lock unit and the second lock unit to cause movement of the first lock unit to be transmitted to the second lock unit.

Clause 32. The glove compartment of clause 21, any other clause, or any combination of clauses, wherein the first and second lock units move away from one another when the latch is in the unlocked configuration and move toward one another when the latch is in the locked configuration.

Clause 33. The glove compartment of clause 32, any other clause, or any combination of clauses, further comprising an actuator coupled to the latch to cause the latch change between the locked and unlocked configurations in response to an input.

Clause 34. The glove compartment of clause 33, any other clause, or any combination of clauses, wherein the actuator includes a shape-memory alloy wire coupled to the first lock unit and second lock unit to cause the first lock unit and second lock unit to move in response to changes in length of the shape-memory alloy wire between a first length associated with the locked configuration and a relatively smaller second length associated with the unlocked arrangement and a control system coupled to the shape-memory alloy wire.

Clause 35. An actuator for a latch, the actuator comprising a shape-memory alloy wire coupled to the first lock unit to cause the first lock unit and second lock unit to move in response to changes in length of the shape-memory alloy wire between a first length associated with the locked configuration and a relatively smaller second length associated with the unlocked arrangement.

Clause 36. The actuator of clause 35, any other clause, or any other combination of clauses further comprising a control system coupled to the shape-memory alloy wire and configured to apply power to the shape-memory alloy wire to cause the shape-memory alloy wire to change between the first and second lengths in response to receipt of the input to the control system.

Clause 37. A compartment of a vehicle, the compartment comprising a box adapted to be coupled to a vehicle in a fixed position relative to the vehicle, the box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 38. The compartment of clause 37, any other clause, or any combination of clauses, further comprising a latch including a lock tab movable between a first position in which movement of the lid relative to the container is blocked when the lid is in the closed position and a second position in which movement of the lid away from the container is permitted.

Clause 39. The compartment of clause 38, any other clause, or any combination of clauses, wherein the latch includes a lock-tab receiver configured to receive the lock tab therein when the lock tab is in the first position and the lid is in the closed position.

Clause 40. The compartment of clause 39, any other clause, or any combination of clauses, wherein the latch includes a tab-mover arm coupled to the lock tab to move therewith.

Clause 41. The compartment of clause 40, any other clause, or any combination of clauses, further comprising an actuator coupled to the tab-mover arm and configured to cause the tab-mover arm to move to cause the lock tab to move between the first and second position in response to an input.

Clause 42. The compartment of clause 42, any other clause, or any combination of clauses, wherein the actuator includes a shape-memory alloy wire coupled to the tab-mover arm to move the tab-mover arm in response to changes in length of the shape-memory alloy wire between a first length associated with the first position and a relatively smaller second length associated with the second position.

Clause 43. The compartment of clause 42, any other clause, or any combination of clauses, wherein the actuator includes a control system coupled to the shape-memory alloy wire and configured to apply power to the shape-memory alloy wire to cause the shape-memory alloy wire to change between the first and second lengths in response to receipt of the input to the control system.

The invention claimed is:
1. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture, a latch including a first lock tab movable between a first lock-tab position in which movement of the lid relative to the container is blocked when the lid is in the closed position and a second lock-tab position in which movement of the lid away from the container is permitted, a first lock-tab receiver configured to receive the first lock tab therein when the lock tab is in the first lock-tab position and the lid is in the closed position, and a first tab-mover arm coupled to the first lock tab to move therewith, and an actuator coupled to the first tab-mover arm and configured to cause the first tab-mover arm to move to cause the first lock tab to move between the first and second lock-tab positions in response to an input, wherein the actuator includes a shape-memory alloy wire coupled to the first tab-mover arm to move the first tab-mover arm in response to changes in length of the shape-memory alloy wire between a first length associated with the first lock-tab position and a relatively smaller second length associated with the second lock-tab position and a control system coupled to the shape-memory alloy wire and configured to apply power to the shape- memory alloy wire to cause the shape-memory alloy wire to change between the first and second lengths in response to receipt of the input to the control system.

2. The glove compartment of claim 1, wherein the first lock tab moves in a first direction from the first lock-tab position to the second lock-tab position and a first section of the shape-memory alloy wire moves in an opposite second direction to cause a second section of the shape-memory alloy wire to move in the first direction and the second section of the shape-memory alloy wire arranged to extend between and interconnect the first tab-mover arm and the first portion of the shape-memory alloy wire to move the first tab-mover arm.

3. The glove compartment of claim 2, wherein the latch further includes a second lock tab movable between a third lock-tab position in which movement of the lid relative to the container is blocked when the lid is in the closed position and a fourth lock-tab position in which movement of the lid away from the container is permitted, a second lock-tab receiver configured to receive the second lock tab therein when the second lock tab is in the third lock-tab position and the lid is in the closed position, and a second tab-mover arm coupled to the second lock tab to move therewith.

4. The glove compartment of claim 3, wherein the second lock tab moves in the second direction from the third lock-tab position to the fourth lock-tab position and a third section of the shape-memory alloy wire moves in the first direction to cause a fourth section of the shape-memory alloy wire to move in the second direction and the fourth section of the shape-memory alloy arranged to extend between and interconnect the second tab-mover arm and third portion of the shape-memory alloy wire to move the first tab-mover arm.

5. The glove compartment of claim 4, wherein the actuator includes a wire guide coupled to the container and configured to engage and guide the shape-memory alloy wire as the shape-memory allow wire changes between the first length and the relatively smaller second length, the wire guide includes a first pulley coupled to the container and configured to rotate about a first axis relative to the container and a second pulley located in spaced-apart relation to the first pulley and configured to rotate about a second axis relative to the container, and the first and second pulleys rotate in response to the shape-memory alloy wire changing between the first length and the relatively smaller second length.

6. The glove compartment of claim 1, wherein the first lock tab moves in a first direction from the first lock-tab position to the second lock-tab position and a first section of the shape-memory alloy wire moves in an opposite second direction to cause a second section of the shape-memory alloy wire arranged to extend between an interconnect the tab-mover arm and the first portion of the shape-memory alloy wire to move the first tab-mover arm, wherein the latch further includes a second lock tab movable between a third lock-tab position in which movement of the lid relative to the container is blocked when the lid is in the closed position and a fourth lock-tab position in which movement of the lid away from the container is permitted, a second lock-tab receiver configured to receive the second lock tab therein when the second lock tab is in the third lock-tab position and the lid is in the closed position, and a second tab-mover arm coupled to the second lock tab to move therewith, wherein the second lock tab moves in the second direction from the third lock-tab position to the fourth lock-tab position and a third section of the shape-memory alloy wire moves in the first direction to cause a fourth section of the shape-memory alloy wire to move in the second direction and the fourth section of the shape-memory alloy arranged to extend between and interconnect the second tab-mover arm and third portion of the shape-memory alloy wire to move the first tab-mover arm, wherein the actuator includes a wire guide coupled to the container and configured to engage and guide the shape-memory alloy wire as the shape-memory allow wire changes between the first length and the relatively smaller second length, the wire guide includes a first pulley coupled to the container and configured to rotate about a first axis relative to the container and a second pulley located in spaced-apart relation to the first pulley and configured to rotate about a second axis relative to the container, and the first and second pulleys rotate in response to the shape-memory alloy wire changing between the first length and the relatively smaller second length, and wherein the wire guide further includes a first spring coupled to the first tab-mover arm and configured to provide a first bias force to the first tab-mover arm to urge the first tab-mover arm to move in the second direction to cause the first lock-tab to move toward the first lock-tab position.

7. The glove compartment of claim 6, wherein the first spring is arranged to extend between and interconnect the first tab-mover arm and the second section of the shape-memory alloy wire.

8. The glove compartment of claim 7, wherein the wire guide further includes a second spring coupled to the second tab-mover arm and configured to provide a second bias force to the second tab-mover arm to urge the second tab-mover arm to move in the first direction to cause the second lock-tab to move toward the third lock-tab position.

9. The glove compartment of claim 8, wherein the first spring is a crimped portion of the shape-memory alloy wire.

10. The glove compartment of claim 1, wherein the first lock tab moves in a first direction from the first lock-tab position to the second lock-tab position and a first section of the shape-memory alloy wire moves in an opposite second direction to cause the first tab-mover arm to move the first lock-tab to the second lock-tab position.

11. The glove compartment of claim 10, wherein the latch further includes a second lock tab movable between a third lock-tab position in which movement of the lid relative to the container is blocked when the lid is in the closed position and a fourth lock-tab position in which movement of the lid away from the container is permitted, a second lock-tab receiver configured to receive the second lock tab therein when the second lock tab is in the third lock-tab position and the lid is in the closed position, and a second tab-mover arm coupled to the second lock tab to move therewith.

12. The glove compartment of claim 11, wherein the second lock tab moves in the second direction from the third lock-tab position to the fourth lock-tab position and a second section of the shape-memory alloy wire moves in the first direction to cause the second tab-mover arm to move the second lock-tab to the second lock-tab position.

13. The glove compartment of claim 12, wherein the actuator includes a wire transmission coupled to the container and configured to transfer movement of the shape-memory alloy wire as the shape-memory alloy wire changes from the first length to the relatively smaller second length to the first and second tab-mover arms.

14. The glove compartment of claim 1, wherein the first lock tab moves in a first direction from the first lock-tab position to the second lock-tab position and a first section of the shape-memory alloy wire moves in an opposite second direction to cause the first tab-mover arm to move the first lock-tab to the second lock-tab position,
    wherein the latch further includes a second lock tab movable between a third lock-tab position in which movement of the lid relative to the container is blocked when the lid is in the closed position and a fourth lock-tab position in which movement of the lid away from the container is permitted, a second lock-tab receiver configured to receive the second lock tab therein when the second lock tab is in the third lock-tab position and the lid is in the closed position, and a second tab-mover arm coupled to the second lock tab to move therewith,
    wherein the second lock tab moves in the second direction from the third lock-tab position to the fourth lock-tab position and a second section of the shape-memory alloy wire moves in the first direction to cause the second tab-mover arm to move the second lock-tab to the second lock-tab position,
    wherein the actuator includes a wire transmission coupled to the container and configured to transfer movement of the shape-memory alloy wire as the shape-memory alloy wire changes from the first length to the relatively smaller second length to the first and second tab-mover arms, and
    wherein the wire transmission includes a first spring arranged to extend between and interconnect the first section of the shape-memory alloy wire and the first tab-mover arm, the first spring configured to transmit movement of the first section of the shape-memory alloy wire in the first direction to the first tab-mover arm to cause the first tab-mover arm to move in the second direction, and the first spring is further configured to provide a first bias force to the first tab-mover arm to urge the first tab-mover arm to move in the second direction to cause the first lock tab to move toward the first lock-tab position.

15. The glove compartment of claim 14, wherein the wire transmission further includes a second spring arranged to extend between and interconnect the second section of the shape-memory alloy wire and the second tab-mover arm, the second spring configured to transmit movement of the second section of the shape-memory alloy wire in the second direction to the second tab-mover arm to cause the second tab-mover arm to move in the first direction, and the second spring is further configured to provide a second bias force to the second tab-mover arm to urge the second tab-mover arm to move in the first direction to cause the second lock tab to move toward the third lock-tab position.

16. The glove compartment of claim 15, wherein the first and second springs are torsion springs.

17. The glove compartment of claim 1, wherein the control system includes an input system configured to provide the input and the input system includes a touch screen coupled to the control system and configured to provide the input in response to engagement of the touch screen.

18. A glove compartment comprising
    a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
    a latch coupled to the container to change between a locked configuration in which movement of the lid from the closed position is blocked and an unlocked configuration in which movement of the lid from the closed position is permitted, the latch including a first lock unit coupled to the container to move relative to the container, a second lock unit coupled to the container to move relative to the container, and a lock-unit transmission arranged to extend between and interconnect the first lock unit and the second lock unit to cause movement of the first lock unit to be transmitted to the second lock unit, the first and second lock units move away from one another when the latch is in the unlocked configuration and move toward one another when the latch is in the locked configuration, and
    an actuator coupled to the latch to cause the latch to change between the locked and unlocked configurations in response to an input,
    wherein the actuator includes a shape-memory alloy wire coupled to the first lock unit and second lock unit to cause the first lock unit and second lock unit to move in response to changes in length of the shape-memory alloy wire between a first length associated with the locked configuration and a relatively smaller second length associated with the unlocked arrangement and a control system coupled to the shape-memory alloy wire and configured to apply power to the shape-memory alloy wire to cause the shape-memory alloy wire to change between the first and second lengths in response to receipt of the input to the control system.

* * * * *